US008295985B2

(12) United States Patent
Crist

(10) Patent No.: US 8,295,985 B2
(45) Date of Patent: Oct. 23, 2012

(54) LATCHING SOLENOID ENERGY RESERVE

(75) Inventor: Timothy J. Crist, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 342 days.

(21) Appl. No.: 12/341,764

(22) Filed: Dec. 22, 2008

(65) Prior Publication Data
US 2010/0161144 A1  Jun. 24, 2010

(51) Int. Cl.
G05D 11/00 (2006.01)
(52) U.S. Cl. ........................................ 700/284
(58) Field of Classification Search .................... 700/284
See application file for complete search history.

(56) References Cited

U.S. PATENT DOCUMENTS

| 3,547,154 | A |   | 12/1970 | Benham |        |
|-----------|---|---|---------|--------|--------|
| 3,729,710 | A |   | 4/1973  | Sherwin |       |
| 3,747,620 | A |   | 7/1973  | Kah    |        |
| 3,941,348 | A | * | 3/1976  | Mott ............... | 251/58 |
| 3,989,066 | A |   | 11/1976 | Sturman |       |
| 4,007,458 | A |   | 2/1977  | Hollabaugh |    |
| 4,121,114 | A |   | 10/1978 | Ruggles |       |
| 4,131,882 | A |   | 12/1978 | Hollabaugh |    |
| 4,165,532 | A |   | 8/1979  | Kendall |       |
| 4,176,395 | A |   | 11/1979 | Evelyn-Veere | |
| 4,241,375 | A |   | 12/1980 | Ruggles |       |
| 4,423,484 | A |   | 12/1983 | Hamilton |      |
| 4,535,401 | A |   | 8/1985  | Penn   |        |
| 4,548,225 | A |   | 10/1985 | Busalacchi |    |
| 4,562,506 | A |   | 12/1985 | Moran  |        |
| 4,596,266 | A | * | 6/1986  | Kinghorn et al. ............ | 137/172 |
| 4,645,882 | A |   | 2/1987  | Nakayama |     |
| 4,716,490 | A |   | 12/1987 | Alexanian |     |
| 4,718,454 | A |   | 1/1988  | Appleby |       |
| 4,777,556 | A |   | 10/1988 | Imran  |        |
| 4,811,221 | A |   | 3/1989  | Sturman |       |
| 5,021,939 | A |   | 6/1991  | Pulgiese |      |

(Continued)

FOREIGN PATENT DOCUMENTS
GB       2177582        1/1987
(Continued)

OTHER PUBLICATIONS

EP; App. No. EP09180196; Extended European Search Report mailed Apr. 9, 2010.

(Continued)

Primary Examiner — Mohammad Ali
Assistant Examiner — Sivalingam Sivanesan
(74) Attorney, Agent, or Firm — Fitch, Even, Tabin & Flannery, LLP

(57) ABSTRACT

An irrigation device including an actuator configured to control water flow to at least one water delivery device, a first stored energy source configured to power the actuator to effect irrigation via the at least one water delivery device, and a second stored energy source which is separate from the first stored energy source, wherein the second stored energy source is configured to power the actuator to terminate the irrigation via the at least one water delivery device. The irrigation devices further includes a controller configured to cause the first stored energy source to power the actuator to effect the irrigation, responsive to an instruction to provide irrigation, and to cause the second stored energy source to power the actuator to terminate the irrigation responsive to a termination condition.

24 Claims, 4 Drawing Sheets

U.S. PATENT DOCUMENTS

| | | | | |
|---|---|---|---|---|
| 5,048,755 | A | 9/1991 | Dodds | |
| 5,079,667 | A | 1/1992 | Kasano | |
| 5,100,056 | A | 3/1992 | Theodorsen | |
| 5,229,649 | A | 7/1993 | Nielsen | |
| 5,251,153 | A | 10/1993 | Nielsen | |
| 5,333,785 | A | 8/1994 | Dodds | |
| 5,347,421 | A | 9/1994 | Alexanian | |
| 5,402,303 | A | 3/1995 | Luck | |
| 5,485,400 | A | 1/1996 | Warrior | |
| 5,638,847 | A * | 6/1997 | Hoch et al. | 137/80 |
| 5,649,818 | A * | 7/1997 | Day | 431/6 |
| 5,655,561 | A | 8/1997 | Wendel | |
| 5,661,349 | A | 8/1997 | Luck | |
| 5,740,031 | A | 4/1998 | Gagnon | |
| 5,760,706 | A | 6/1998 | Kiss | |
| 5,780,938 | A | 7/1998 | Edwards | |
| 5,825,664 | A | 10/1998 | Warrior | |
| 5,826,619 | A | 10/1998 | Roman | |
| 5,839,658 | A | 11/1998 | Sarver | |
| 5,848,609 | A | 12/1998 | Marchesseault | |
| 5,914,847 | A | 6/1999 | Alexanian | |
| 5,938,172 | A | 8/1999 | Ohtsuka | |
| 6,021,038 | A | 2/2000 | Hanchett, Jr. | |
| 6,126,141 | A | 10/2000 | Geiger | |
| 6,154,354 | A | 11/2000 | Alexanian | |
| 6,283,139 | B1 | 9/2001 | Symonds | |
| 6,335,855 | B1 | 1/2002 | Alexanian | |
| 6,337,635 | B1 | 1/2002 | Ericksen | |
| 6,351,366 | B1 | 2/2002 | Alexanian | |
| 6,378,838 | B1 | 4/2002 | Brundisini | |
| 6,460,563 | B2 | 10/2002 | Olson | |
| 6,652,188 | B1 | 11/2003 | Albright | |
| 6,694,223 | B1 | 2/2004 | Goldberg | |
| 6,721,630 | B1 | 4/2004 | Woytowitz | |
| 6,763,287 | B2 | 7/2004 | Brundisini | |
| 6,766,221 | B1 | 7/2004 | Christiansen | |
| 6,782,310 | B2 | 8/2004 | Bailey | |
| 6,782,311 | B2 | 8/2004 | Barlow | |
| 6,783,287 | B2 | 8/2004 | Kudo | |
| 6,812,826 | B2 | 11/2004 | Buhler | |
| 6,842,667 | B2 | 1/2005 | Beutler | |
| 6,898,467 | B1 | 5/2005 | Smith | |
| 6,948,697 | B2 | 9/2005 | Herbert | |
| 6,993,416 | B2 | 1/2006 | Christiansen | |
| 7,058,479 | B2 | 6/2006 | Miller | |
| 7,069,115 | B1 | 6/2006 | Woytowitz | |
| 7,084,741 | B2 | 8/2006 | Plummer | |
| 7,123,993 | B1 * | 10/2006 | Freeman et al. | 700/284 |
| 7,146,225 | B2 | 12/2006 | Guenst | |
| 7,146,255 | B2 | 12/2006 | Christiansen | |
| 7,181,319 | B1 | 2/2007 | Woytowitz | |
| 7,182,272 | B1 | 2/2007 | Marian | |
| 7,206,669 | B2 | 4/2007 | Christiansen | |
| 7,245,991 | B1 | 7/2007 | Woytowitz | |
| 7,248,945 | B2 | 7/2007 | Woytowitz | |
| 7,257,465 | B2 | 8/2007 | Perez | |
| 7,286,904 | B2 | 10/2007 | Graham | |
| 7,289,862 | B2 | 10/2007 | Britton | |
| 7,358,626 | B2 | 4/2008 | Gardner | |
| 7,359,769 | B2 | 4/2008 | Bailey | |
| 7,403,840 | B2 | 7/2008 | Moore | |
| 7,421,317 | B2 | 9/2008 | Christiansen | |
| 7,444,207 | B2 | 10/2008 | Nickerson | |
| 7,458,521 | B2 | 12/2008 | Ivans | |
| 7,526,365 | B1 | 4/2009 | Frerich | |
| 7,826,931 | B2 | 11/2010 | Lorenz | |
| 2002/0035414 | A1 | 3/2002 | Morikawa | |
| 2002/0053970 | A1 | 5/2002 | Plummer | |
| 2002/0071234 | A1 | 6/2002 | Alexanian | |
| 2002/0085333 | A1 | 7/2002 | Alexanian | |
| 2002/0091452 | A1 | 7/2002 | Addink | |
| 2002/0166986 | A1 | 11/2002 | Remby | |
| 2003/0006882 | A1 | 1/2003 | Buhler | |
| 2003/0120393 | A1 | 6/2003 | Bailey | |
| 2003/0135286 | A1 | 7/2003 | Brundisini | |
| 2003/0179102 | A1 | 9/2003 | Barnes | |
| 2003/0201675 | A1 | 10/2003 | Alexanian | |
| 2004/0039489 | A1 | 2/2004 | Moore | |
| 2004/0046137 | A1 | 3/2004 | Herbert | |
| 2004/0086053 | A1 | 5/2004 | Anderson | |
| 2004/0225412 | A1 * | 11/2004 | Alexanian | 700/284 |
| 2005/0004715 | A1 | 1/2005 | Christiansen | |
| 2005/0038529 | A1 | 2/2005 | Perez | |
| 2005/0055106 | A1 | 3/2005 | Beutler | |
| 2005/0087620 | A1 * | 4/2005 | Bowers et al. | 239/63 |
| 2005/0156067 | A1 | 7/2005 | Ivans | |
| 2005/0156068 | A1 | 7/2005 | Ivans | |
| 2005/0264973 | A1 | 12/2005 | Gardner | |
| 2005/0273205 | A1 | 12/2005 | Nickerson | |
| 2006/0043208 | A1 | 3/2006 | Graham | |
| 2006/0080003 | A1 | 4/2006 | Christiansen | |
| 2006/0091245 | A1 | 5/2006 | Ivans | |
| 2006/0116793 | A1 | 6/2006 | Christiansen | |
| 2006/0206239 | A1 | 9/2006 | Christiansen | |
| 2007/0035907 | A1 * | 2/2007 | Doering et al. | 361/160 |
| 2007/0106426 | A1 | 5/2007 | Ensworth | |
| 2007/0179674 | A1 | 8/2007 | Ensworth | |
| 2007/0282486 | A1 | 12/2007 | Walker | |
| 2008/0027587 | A1 | 1/2008 | Nickerson | |
| 2008/0039978 | A1 | 2/2008 | Graham | |
| 2008/0058995 | A1 * | 3/2008 | Holindrake et al. | 700/284 |
| 2008/0157995 | A1 | 7/2008 | Crist et al. | |
| 2008/0211307 | A1 | 9/2008 | Gardner | |
| 2008/0275595 | A1 | 11/2008 | Bailey | |
| 2008/0288117 | A1 | 11/2008 | Nickerson | |
| 2008/0319585 | A1 | 12/2008 | Nickerson | |
| 2009/0076659 | A1 | 3/2009 | Ensworth | |
| 2010/0082169 | A1 | 4/2010 | Crist et al. | |
| 2011/0015793 | A1 | 1/2011 | Crist et al. | |
| 2011/0015794 | A1 | 1/2011 | Lorenz | |
| 2011/0015800 | A1 | 1/2011 | Crist et al. | |
| 2011/0017845 | A1 | 1/2011 | Crist et al. | |

FOREIGN PATENT DOCUMENTS

| | | |
|---|---|---|
| WO | WO 86/06579 A1 | 11/1986 |
| WO | WO 02/058254 A1 | 7/2002 |

OTHER PUBLICATIONS

Michrochip Technology Inc.; PIC/16F631/677/685/687,689/690 *Data Sheet*; 20-Pin Flash-Based, 8-Bit CMOS Microcontollers with Nano Watt Technology; 2006; 294 pages.

Rain Bird, "FD Field Decoders: Rain Bird Decoders", Feb. 17, 2005, pp. 1-4, printed from www.rainbird.com/golf/products/centralcontrol/decoders.htm, Rain Bird Corporation, Glendora, CA.

Rain Bird, "Full/Part Circle Roters", Oct. 2004, pp. 1-4, Catalog No. 438, Rain Bird Corporation, Glendora, CA.

Rain Bird, "Tech Specs: Rain Bird Decoders", Oct. 2004, Rain Bird Corporation Golf Division, Tucson, AZ. (2 pages).

The Toro Company; "Golf Decoder Control System (GDC)"; Jun. 25, 2007, pp. 1-3, printed from http://web.archive.org/web/20070625035525/www.toro.com/irrigation/golf/lgturffield/gdc/index.html, The Toro Company, Bloomington, MN.

* cited by examiner

LATCHING SOLENOID ENERGY RESERVE

BACKGROUND OF THE INVENTION

1. Field of the Invention

The present invention relates generally to irrigation control devices, and more particularly to the powering of irrigation control devices using an energy reserve.

2. Discussion of the Related Art

Typical irrigation control systems cooperate with water valves and pumps to control the flow of irrigation water through a variety of water dispensing devices, including sprinklers, rotors, drip-lines, and other water delivery devices. These control systems are used in a wide variety of irrigation applications, from residential and commercial landscapes to golf course and agricultural irrigation. Rotors, for example, irrigate by throwing a jet or spray of water that is rotated about a generally vertical axis. Rotors are supplied with water from water supply lines that are usually installed below ground and are typically actuated by electric solenoid-controlled valves.

Water flow through a rotor or other water delivery device is often controlled through the use of a valve that is transitioned between open and closed states. In many instances the position of the valve is controlled by a solenoid. Two common forms of solenoids used for irrigation are latching solenoids and non-latching solenoids. A typical non-latching solenoid requires continual power to maintain the open (irrigating) position. Thus, if power is lost or removed in a typical AC or DC non-latching solenoid, the valve returns to a closed position as a failsafe.

Latching solenoids, on the other hand, require a certain amount of energy (e.g., a first energy burst) to open, and a similar amount of energy (e.g., a second energy burst) to close. The on/off pulse is usually supplied by a large capacitor acting as a local energy reserve. If power is lost soon after the latching solenoid is turned on it may not have sufficient time to recharge its energy reserve so that it may be assured that it can also close. If power is lost and the latching solenoid cannot be closed, significant turf damage can occur due to the large amount of unintended irrigation that would continuously flow until the fault is discovered and manually corrected. In applications where a latching solenoid valve is controlled using a battery or other depleteable power source, care should be taken to ensure that sufficient energy remains to close the valve once opened to avoid overwatering.

SUMMARY OF THE INVENTION

In one embodiment, the invention can be characterized as a method for controlling irrigation which includes powering an actuator to open a valve responsive to an instruction to provide irrigation using power from a first stored energy source, and powering the actuator to close the valve using power from a second stored energy source if a stored energy level of the second stored energy source falls below a first threshold level.

In another embodiment, the invention can be characterized as a method for controlling irrigation which includes powering an actuator to open a valve responsive to an instruction to provide irrigation using power from a first stored energy source, and powering the actuator to close the valve responsive to a termination condition (e.g., exceeding a time threshold) using power from a second stored energy source which is separate from the first stored energy source.

In a further embodiment, the invention may be characterized as an irrigation device including an actuator configured to control water flow to at least one water delivery device, a first stored energy source configured to power the actuator to effect irrigation via the at least one water delivery device, and a second stored energy source which is separate from the first stored energy source, wherein the second stored energy source is configured to power the actuator to terminate the irrigation via the at least one water delivery device. The irrigation devices further include a controller configured to cause the first stored energy source to power the actuator to effect the irrigation, responsive to an instruction to provide irrigation, and to cause the second stored energy source to power the actuator to terminate the irrigation responsive to a termination condition.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
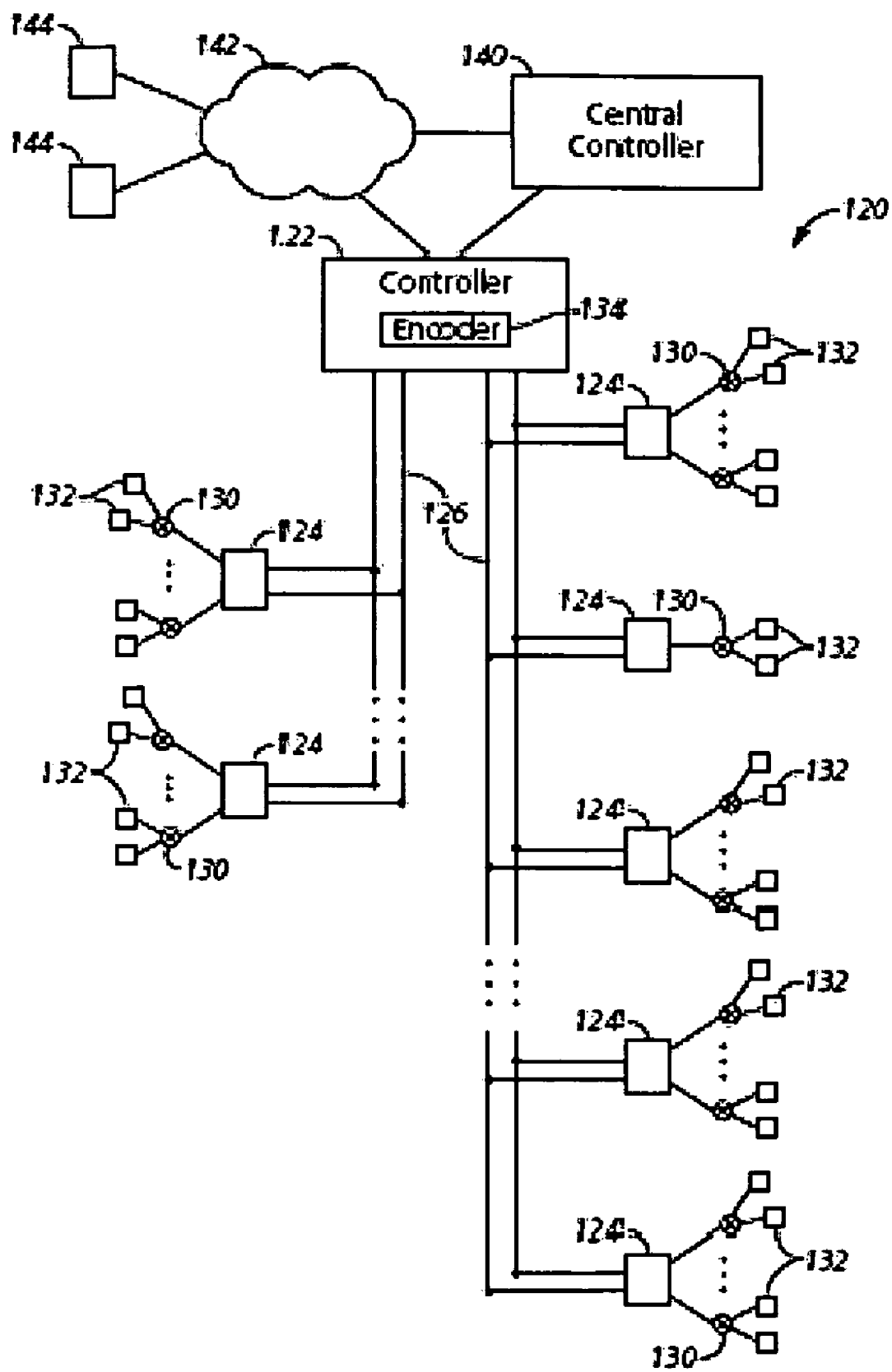
FIG. 1 depicts a simplified block diagram of an irrigation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 depicts a simplified block diagram of an irrigation system 120 according to some embodiments. The irrigation system includes an irrigation controller 122 and one or more remote irrigation devices 124 coupled with the irrigation controller through one or more two-wire power lines, paths or interfaces 126. The irrigation devices 124 can each include an electronic control module and are coupled with one or more valves and/or field stations 130 that cooperate with one or more sprinklers, rotors, drip-lines, and/or other water delivery devices 132 to supply water to the water delivery devices. In some implementations, the irrigation controller 122 is a satellite controller and further couples with a central irrigation controller 140 that provides at least some control over the irrigation controller. Typically, the central irrigation controller 140 couples with a plurality of irrigation controllers 122 and/or other such satellite irrigation controllers to coordinate the irrigation by the multiple irrigation controllers.

The irrigation controller 122 further includes an encoder 134 that allows the irrigation controller to encode information onto an AC power signal, for example, by clipping one or more of the positive and/or negative peaks of the signals providing communication in addition to power to the one or more irrigation devices 124. Encoders are well known in the art and as such no further explanation of an encoder is provided. The irrigation devices coupled with the two-wire interface 126 draw operating power from the two-wire line and/or interface 126 as well as receive communications, such as irrigation instructions, parameters, conditions and the like that at least in part can be used in controlling and/or coordinating the implementation of irrigation and/or irrigation schedules.

Further, the irrigation controller 122 can optionally couple with one or more distributed networks 142, such as an intranet, the Internet or other such networks. It is understood that the network 142, however, can be substantially any relevant wired or wireless communication network, networks or combination of networks to communicate data, such as public switched telephone network (PSTN), cellular, paging, radio frequency broadcast, hybrid networks of one or more of fiber, cable and/or satellite, and other relevant networks, and that the irrigation controller can connect with the network through wired, wireless or a combination of wired and wireless connections. By coupling with the network the irrigation controller 122 can access other devices 144 on the network, such as servers, weather stations, databases and the like to receive and/or forward scheduling information, control information, weather information, evapotranspiration (ET) data, operating parameters, and/or other such relevant data and information.

In operation, the irrigation devices 124 receive input power signals from over the two-wired interface 126 and attempt to decode communications encoded onto the AC voltage input signal. In some implementations, the irrigation devices detect a synchronization pulse or other identifier and synchronize the timing and/or operation of the irrigation device based on the receipt of that synchronization. Additional data can be decoded from the input signal. When multiple irrigation devices are active on a single two-wire interface, the power signal can include a device identifier (ID) that designates to which irrigation device or devices the communication is being directed. As such, an irrigation device can extract the device ID from the decoded data and determine whether the communication is directed to the irrigation device. When the communication is directed to the irrigation device, the irrigation device can utilize the data decoded and take appropriate action, such as activating or deactivating irrigation, implementing instructions or schedules, altering parameters and the like.

Figure 2:
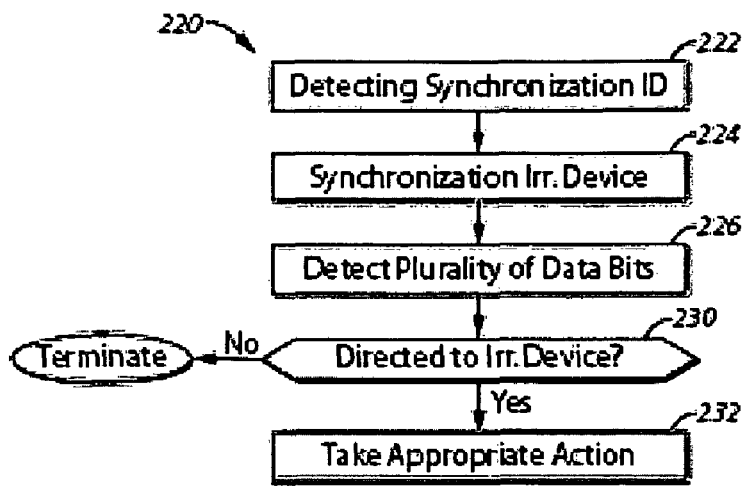
FIG. 2 depicts a simplified flow diagram of a process of receiving communications and/or controlling irrigation according to some embodiments.

FIG. 2 depicts a simplified flow diagram of a process 220 of receiving communications and/or controlling irrigation according to some embodiments. In step 222, a synchronization identifier is detected. The synchronization identifier typically is defined by a modulated pulse or series of pulses that can be distinguished from other modulation, such as a predefined pattern, attenuating or clipping a predefined portion of a pulse (e.g., clipping a negative side of a pulse), attenuating one or more pulses by a predefined amount or other such detectable modulation.

In step 224, the irrigation device is synchronized, for example, noting a relationship between the receipt of the synchronization and one or more internal clocks and/or timers, adjusting one or more internal clocks and/or times, and/or internal component operations and/or other such synchronizations. For example, in some embodiments synchronization provides a known starting point for the irrigation device and/or processes of the irrigation device, to restart clocks and prepare to receive data over the two-wire path. In step 226, a plurality of data pulses are detected and decoded. These data pulses can include device ID, instructions, parameters and/or other such information as described above and further below. In step 230, it is determined whether the data being received over the two-wired interface are directed to the irrigation controller. When the communication is not directed to the irrigation controller the process 220 terminates and/or returns to step 222 to await a subsequent synchronization. Alternatively, step 232 is entered where the irrigation device 124 takes appropriate action, such as activating irrigation, interrupting and/or stopping irrigation, changing parameters, determining local parameters and transmitting a communication based on the determined parameters, and/or other such action.

Figure 3:
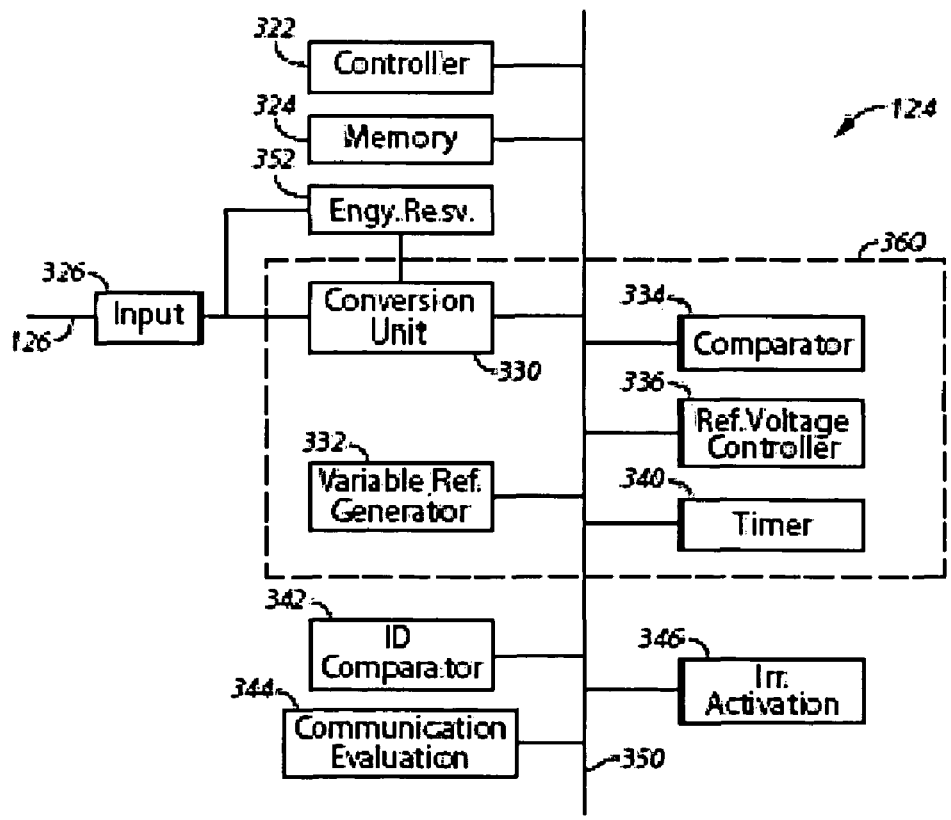
FIG. 3 depicts a simplified block diagram of an embodiment of an irrigation device that couples with and controls field stations and further couples with a two-wire interface to receive power as well as irrigation control instructions, parameters and/or other such communications.

FIG. 3 depicts a simplified block diagram of an embodiment of an irrigation device 124 that couples with and controls field stations 130 and further couples with a two-wire interface 126 to receive power as well as irrigation control instructions, parameters and/or other such communications. Numerous irrigation devices 124 can be coupled with a single two-wire interface 126. The irrigation device 124 includes a controller 322, one or more memory 324, a two-wire interface input 326, an AC input conversion unit 330, a variable reference voltage generator 332, one or more data voltage comparators 334, a reference voltage level controller 336, one or more timers 340, a device ID comparator 342, a data communication evaluator 344, and one or more action implementation units 346 that can implement actions according to the data communications received over the two-wire interface, such as an irrigation activation unit, an irrigation halting unit and/or other such units. The components of the irrigation device can be coupled through one or more direct connections, busses and/or other relevant coupling 350. Some embodiments further include a energy reserve 352 and/or other back up power that can allow the irrigation device 124 to initiate irrigation according to locally stored irrigation scheduling should power over the two-wire interface be interrupted. Power from the two-wire interface can, in some instances, be used to store power in the energy reserve.

The irrigation device can be implemented through hardware, firmware, software, or combinations thereof. In some implementations one or more components of the irrigation device are implemented through a single microprocessor, integrated circuit, microcontroller or other device. Additionally or alternatively, one or more of the components of the irrigation device can be implemented within the controller 322. For example, the reference voltage controller 336, some or all of the memory 324, the timer 340, ID comparator 342, communication evaluator 344, one or more of the action implementation units 346 and/or other components could be implemented in whole or in part through the controller 322. The irrigation device 124, can in some implementations, include an electronic control module 360 that comprises one or more components in decoding the received input signal, such as the conversion unit 330, the variable reference voltage generator 332, the comparator 334, the reference voltage controller 336 and/or one or more timers 340. Additionally in some instances, the ID comparator 342 and/or communication In some embodiments, many of the components of the irrigation device 124 are implemented through a microcontroller, such as one of the series of PIC16F677, 687, 689 manufactured by Microchip Technology, Inc. of Chandler, Ariz. or other similar controller.

The controller 322 can be implemented through one or more processors, microprocessors, microcontrollers, state machines or other such relevant controllers or combinations of controllers that provide overall functionality, data processing, and control over the irrigation device 124. The one or more memory 324 can store software programs, executables, data, irrigation control programming, scheduling, runtime parameters, soil conditions and parameters, other relevant programs and data, and instructions executable by a processor, machine or computer. The memory can be implemented through ROM, RAM, EEPROM, volatile disk drives, flash memory, removable medium (e.g., floppy disc, hard disc, compact disc (CD), digital versatile disc (DVD), flash memory, and the like), and substantially any other relevant memory or combinations of memory. Generically, the memory 324 may also be referred to as a computer readable medium.

As introduced above, the controller and/or other components of the irrigation device 124 can be implemented by software stored in memory and executed on a microcontroller or processor, or otherwise stored and executed in firmware. Further, the controller and/or other components can be implemented through logic devices, hardware, firmware and/or combinations thereof. Thus, the processing described herein may be performed using substantially any relevant processor logic or logic circuitry.

The AC input conversion unit 330 is coupled with the two-wire interface input 326 to receive the AC voltage signal. In part, the conversion unit 330 attenuates the signal generating a data signal (VDATAF) that is at a level that is more readily utilized by the irrigation device 124. For example, in some instances, the voltage is attenuated to a level that can be utilized in integrated circuits, such as about 5V or less. Further in some embodiments, the conversion unit 330 identifies or extracts an input signal reference voltage (VREFF) as a reference level and/or bias level in further processing the input signal.

The variable reference voltage generator 332 is controlled in part by the controller 322 and generates a comparator reference voltage that is utilized by the comparator 334. In some embodiments, the variable reference voltage generator can alter the reference voltage allowing a single comparator to be used in identifying different aspects of the input signal as further described below, such as applying a first reference voltage at a first level to identify a synchronization indication, and altering the reference voltage to a second voltage level to detect bits of data encoded on the signal. A reference voltage controller 336 can be included that in part dictates a level of the reference voltage generated by the variable reference voltage generator 332.

The comparator 334, as introduced above, receives the reference voltage and compares that reference voltage with an extracted data signal (VDATAF). Based on the comparison, the comparator generates a comparator output signal that is proportional to the relationship between the applied reference voltage and the data signal. The comparator output signal is used to identify data bits encoded on the signal, and in some embodiments, can further activate or awaken at least a portion of the irrigation device 124 from a dormant or sleep state that significantly reduces power consumption as further described below. The timer 340, in some embodiments, is utilized in cooperation with the comparator output to identify data bits and/or synchronization based on one or more time thresholds, for example, time since a detection of a data bit. The timer can also further activate or awaken at least a portion of the irrigation device 124 from a dormant or sleep state that significantly reduces power consumption.

The ID comparator 342 and communication evaluation unit 344 extract data from the received bits to determine whether the communication encoded on the input signal is directed to the irrigation device 124 and/or identifies parameters, instructions and/or requests. The irrigation activation units 346 can implement one or more instructions, such as activating one or more field stations 130, adjust parameters and/or implement other operations.

Figure 4:
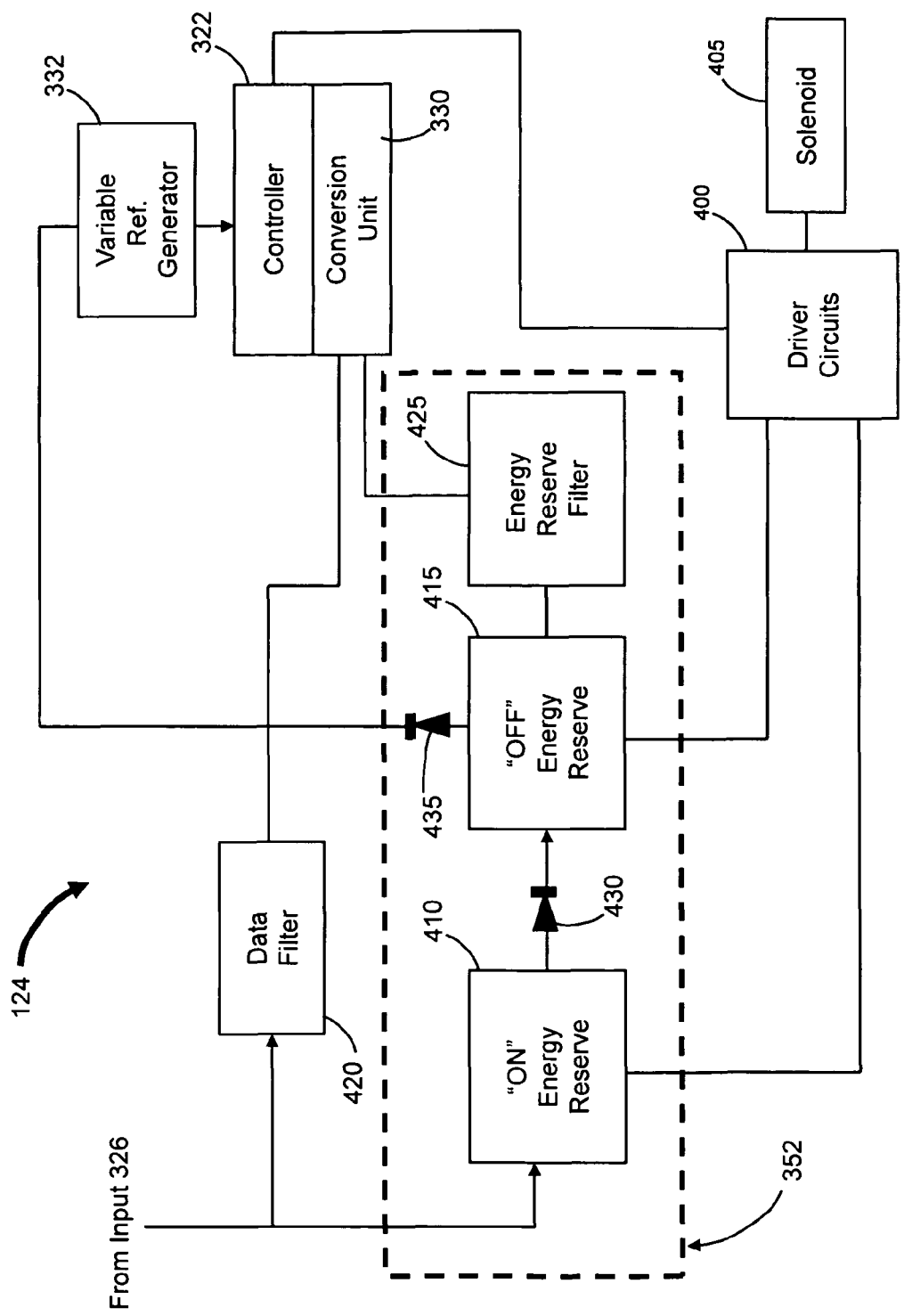
FIG. 4 is a block diagram showing in more detail several components of the irrigation device of FIG. 3 in accordance with several embodiments.

FIG. 4 is a block diagram showing in more detail several components of the irrigation device of FIG. 3. For clarity, several components of the irrigation device shown in FIG. 3 have been omitted in the illustration of FIG. 4. In FIG. 4, irrigation device 124 is shown having energy reserve 352 in communication with conversion unit 330, which operates under the control of controller 322. The controller also controls driver circuits 400 (e.g., an H-bridge circuit) to effect bi-directional current for on/off activation (e.g., forward and backward) of solenoid 405.

FIG. 4 also shows in more detail various components which may be used to implement energy reserve 352. In particular, energy reserve 352 is shown having first energy reserve 410 and second energy reserve 415 positioned to provide power to solenoid 405 via circuits 400. Energy reserve 352 also includes energy reserve filter 425, first diode 430, and second diode 435. Data filter 420 is shown receiving signaling from input 326 and providing such input to conversion unit 330.

First energy reserve 410 is depicted as an "ON" energy reserve since it is commonly used to activate irrigation device 124 to provide irrigation. In an embodiment, first energy reserve 410 functions as a stored energy source providing power to an actuator, such as solenoid 405, to open an associated irrigation valve (e.g., valve 130) to effect irrigation. The first energy reserve may be implemented using a device (e.g., a battery, capacitor, quasi-capacitor, super-capacitor, ultra-capacitor, and combinations thereof) capable of providing desired power to the solenoid.

In accordance with several embodiments, second energy reserve 415 is utilized to power the solenoid to an "OFF" state to close an associated irrigation valve and terminate irrigation. The second energy reserve may be implemented using any of the components (e.g., battery and/or capacitor) and techniques used to implement first energy reserve 410. Typically, the first and second energy reserves are configured using the same or similar components, but this is not a requirement.

As noted above, solenoid 405 is usually coupled with a suitable irrigation valve, such as valve 130, which is coupled to a water supply line on one end and to one or more water delivery devices on the other end. The type of valve and water delivery devices utilized is not critical to various embodiments of the present invention, and thus, further description of such components have been omitted.

Solenoid 405, which is a particular type of actuator, is typically implemented using a latching solenoid which requires energy (e.g., a burst of energy) to open and close. A feature of the solenoid is that it may be configured to control water flow to one or more water delivery devices. The open position of the solenoid refers to an open valve position providing irrigation, and the closed position of the solenoid relates to a closed valve position which does not permit irrigation via associated water delivery devices. A latching solenoid generally has lower power demands as compared to a typical non-latching solenoid. For instance, a non-latching solenoid requires continual power to maintain the open (irrigating) position. Latching solenoids, on the other hand, only require power to open or close; no power is needed to maintain an open or closed position.

A typical irrigation cycle includes powering solenoid 405 to open an associated irrigation valve to provide irrigation, maintaining the solenoid (and associated irrigation valve) in an open state until a desired about of irrigation is achieved (e.g., 15 minutes), and then powering the solenoid to close the irrigation valve and to terminate irrigation. There are a number of scenarios, also referred to herein as irrigation termination conditions, which may trigger, initiate, or otherwise create a need to terminate irrigation. Examples of these scenarios or conditions include loss of power to irrigation device 124, loss of communication to the irrigation device, determination that an elapsed time of irrigation exceeds a maximum time threshold, attenuation of the power source below a threshold, receiving an instruction to terminate irrigation from a remote source (e.g., irrigation controller 122) or a local source (e.g., controller 322), combinations thereof, and the like.

During optimal circumstances, operational power to irrigation device 124 is maintained throughout an irrigation cycle (i.e., the opening and closing of solenoid 405). This operational power, which is typically provided via input 326, may also be used to restore energy or otherwise recharge the first and second energy reserves 410, 415. However, power interruptions to the irrigation device are common.

Reasons for such power interruptions include a physical disruption in the interface (e.g., two-wire interface 126) supplying the power, a power failure at an irrigation controller supplying power to the irrigation device, device or system malfunction, excessive leakage or loading caused by irrigation water making contact with an exposed irrigation wire, and the like. Other situations occur when a worker shuts down or reboots the irrigation controller while one or more irrigation devices are actively irrigating.

A related case that is similarly problematic involves errors relating to manufacturing or installing of the irrigation device. If an irrigation device is installed in an activated position (e.g., a solenoid valve or plunger positioned in an open state), then uncommanded irrigation occurs. Active irrigation may therefore occur even though the system has not yet issued an instruction to begin irrigation. In such scenarios, the irrigation device has not yet been powered, or has only been powered in a limited manner. Regardless of the cause, situations may occur during which the irrigation device encounters a power interruption.

Regardless of the cause, power interruption at an irrigation device may prevent the restoring of energy to first energy reserve 410 to a level necessary to close solenoid 405. This scenario is potentially problematic if the power interruption occurs during the irrigation cycle, after the solenoid and associated valve, for example, has been opened. For instance, consider the scenario of having only one energy reserve (e.g., first energy reserve 410) and a power interruption has occurred before power to the single energy reserve has been restored since it typically takes a certain amount of time to recharge the energy reserve after it has been depleted by issuing on or off current to the solenoid. In this example, the solenoid could not be powered to close an irrigation valve since the single energy reserve does not have sufficient power to do so. As such, the solenoid, and consequently the associated valve, would undesirably remain in the open position possibly resulting in damaging over irrigation.

To minimize or alleviate such concerns, irrigation device 124 includes second energy reserve 415. Whenever irrigation termination is desired, the second energy reserve may be commanded (e.g., by an instruction issued by controller 322) to supply the necessary power to solenoid 405, causing the solenoid and associated valve to close, thereby terminating the irrigation. Since use of the second energy reserve is not required to power solenoid 405 to open the valve, the second energy reserve will have sufficient power to close the solenoid, and consequently, close the valve and terminate irrigation.

It is notable that second energy reserve 415 can close solenoid 405 and the associated valve, even if irrigation device 124 experiences a power interruption during the active irrigation stage of the irrigation cycle. In some cases, the solenoid may be closed without receiving instructions from an external source (e.g., irrigation controller 122), or even if power to the irrigation device has been lost.

In accordance with various embodiments, operation of irrigation device 124 to control irrigation may include receiving an instruction to provide irrigation. This instruction may originate remotely (e.g., irrigation controller 122), locally (e.g., controller 322), or combinations thereof In a remote instruction, data is received via input 326, filtered by data filter 420, and then passed on to conversion unit 330, which operates under the control of controller 322. The data filter is typically configured to remove any unwanted signal noise and power on the modulated data.

At this point, power from first energy reserve 410 may be used to actuate solenoid 405, consequently resulting in the opening of an associated irrigation valve, such as valve 130. At some point, irrigation device 124 determines that irrigation provided by the irrigation device is to terminate. This operation may occur by closing solenoid 405 using second energy reserve 415, resulting in the closing of the irrigation valve.

Consider now the scenario in which irrigation device 124 experiences a power interruption while the solenoid is open, which may prevent restoring of energy to first energy reserve 410 to a level necessary to close solenoid 405. Such a scenario does not negatively affect closing operations of irrigation device 125 since, once again, power from first energy reserve 410 is not relied upon for closing the solenoid since this function is, in many cases, performed by second energy reserve 415.

Various embodiments of the present invention have been described, but still further features may alternatively or additionally be implemented in accordance with alternative embodiments of the present invention. One such feature relates to operations that may be performed after a power interruption has occurred. In this scenario, controller 322 would cease to function because of the lack of power. However, operation of the controller may be sustained using power provided by second energy reserve 415. The second energy reserve does not generally maintain power to the controller for an extended period of time. However, this time period is sufficient to allow the irrigation device to terminate irrigation, thus avoiding an over irrigation situation. One variation on this embodiment is to supply power to controller 322 prior to opening solenoid 405. The controller may then be used to determine if, upon receiving an instruction to irrigate, first energy reserve 410 has sufficient energy to open solenoid 405. The solenoid may therefore be open only if the first energy reserve has sufficient energy to do so.

A potential drawback with using second energy reserve 415 for supplying power to controller 322 is that the energy level of the second energy reserve may fall below an amount necessary to close solenoid 405. To prevent this from occurring, the irrigation device may monitor or otherwise determine the energy level (e.g., voltage level) of the second energy reserve on a periodic, repeated, or other basis. If the energy level of the second energy reserve falls below a threshold level, the solenoid may then be closed by the second energy reserve while it has sufficient energy to do so.

According to another embodiment, closing solenoid 405 is accomplished using not only second energy reserve 415 but also using power from first energy reserve 410. One technique for accomplishing this is to implement first diode 430 in an electrical path between the first and second energy reserves. This arrangement results in an "or-ing" of the power of these two reserves. Although the first energy reserve will have expended a significant amount of energy to power open solenoid 405, it is possible that it will retain additional energy which may assist the second energy reserve in closing the solenoid. Another possibility is that the power interruption occurred after the first energy reserve has been partially or completely restored or recharged.

A further alternative relates to the component utilized to open and close the irrigation valve. FIG. 4 depicts this device as solenoid 405, but this is not a requirement. Alternative implementations may utilize most any actuatable device which can controllably, usually by means of electrical power, operate the valve or other water control device.

Another alternative relates to the device or devices used to implement the first and second energy reserves 410, 415. As noted above, a capacitor may be used to implement these energy reserves. The particular type and size of the capacitor utilized is not a critical feature. In general, there is a trade off between cost and power. Increased power demands require larger capacitors, thus resulting in increased system cost. Conversely, smaller power demands require smaller capacitors, thus reducing system cost.

It is customary to implement the smallest capacitor possible, as long as the power constraints do not jeopardize system operation. Failure of a capacitor, and in particular the capacitor utilized for closing the irrigation valve, could result in a damaging over irrigation situation. The size of the capacitor utilized will generally be dictated by the power requirements of the system (e.g., solenoid 405). As a non-limiting example, capacitors having a capacitance ranging from 25 μF to 2,300 μF may be implemented in systems in which the solenoid has an operating voltage ranging from about 5 volts to 50 volts.

Figure 5:
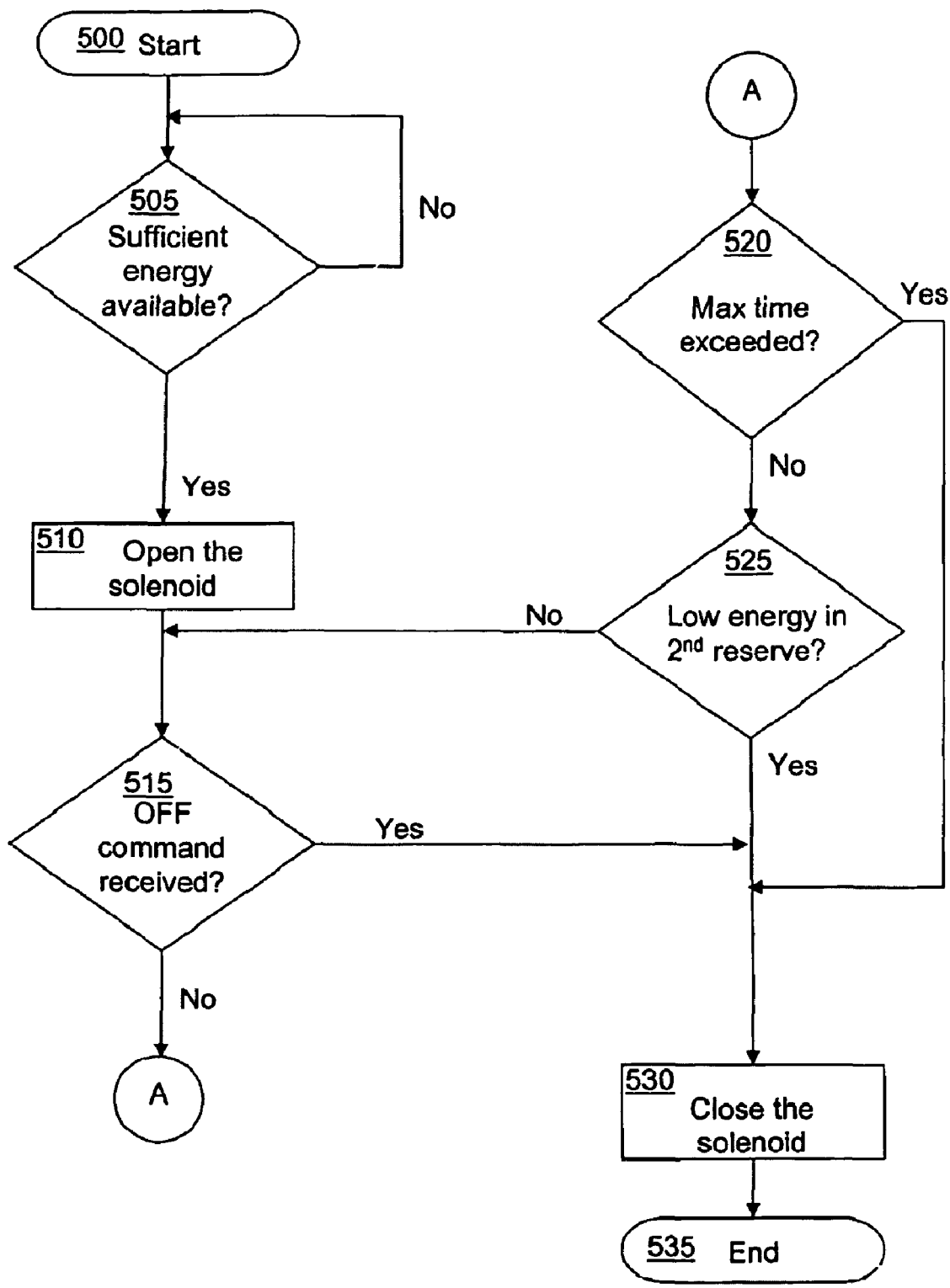
FIG. 5 is a flowchart depicting a method for controlling irrigation in accordance with one embodiment.

FIG. 5 is a flowchart depicting a method for controlling irrigation in accordance with an embodiment of the present invention. This method will be described with occasional reference to the irrigation device depicted in FIG. 4, but it is understood that the disclosed method is not limited to the depicted irrigation device, or any other device. Block 500 depicts the start of operation, which may occur upon receiving an instruction to irrigate. In some cases, this operation occurs after block 232 of FIG. 2.

Optional decision block 505 determines if sufficient energy is available for opening an actuator, such as a solenoid, to effect irrigation. This operation may be achieved by determining the energy level (e.g., voltage) of first energy reserve 410. One technique to determine the stored energy level of the first energy reserve utilizes the following equation:

$$\text{stored energy} = \frac{1}{2} * (C * v^2),$$

where C represents capacitance and v represents volts. If the minimum capacitance is determined, and the minimum required energy (Joules) to open the actuator is also determined, then such information may then used to determine the minimum required voltage to ensure operation of the first energy reserve.

If sufficient energy is not available, control loops back for further measurement of the energy level of the first energy reserve. This operation helps ensure that opening of the solenoid occurs only if the energy level of the first energy reserve exceeds a threshold level. Referring still to block 505, if sufficient energy is available, then control flows to block 510.

Block 510 includes opening the solenoid responsive to an instruction to irrigate. This operation uses, for example, power from the first energy reserve and consequently results in providing the desired irrigation.

Decision blocks 515, 520, and 525 relate to various termination conditions for which the solenoid and associated valve may be closed. Some or all of these conditions may be implemented, in any order, in accordance with various embodiments of the present invention.

Decision block 515 determines if an instruction to terminate irrigation has been received. This instruction may take the form of an OFF command sent by irrigation controller 122 to an associated irrigation device 124 to initiate closing of the solenoid. If an instruction to terminate irrigation is received, control flows to block 530.

Block 530 includes closing the solenoid to close the valve and terminate irrigation, and the method then terminates (block 535). The operation of block 530 may use power from second energy reserve 415 to provide the desired energy. It is understood that this operation may be performed in situations in which power provided by an external source to the irrigation device has been interrupted.

Returning to decision block 515, if an instruction terminating irrigation has not been received, then control may flow to decision block 520.

Block 520 determines if a time period during which the solenoid has been open exceeds a maximum time threshold (e.g., 15 minutes). If the time period has been exceeded, then control flows to block 530 and operation continues as described above. On the other hand, if the time period has not been exceeded, then control flows to decision block 525.

Block 525 determines if the energy level of the second energy reserve falls below a threshold level. An example of this threshold level is that which is 33% of the typical operating voltage measured in conversation unit 330 as received from energy reserve filter 425.

Typically, this energy level is one which would permit the second energy reserve to closed solenoid 405 and its associated valve. This feature attempts to avoid the situation in which the second energy reserve is drained to the point at which it can no longer function to close the solenoid. If the energy level of the second energy reserve falls below the threshold, then control flows to block 530 and operation continues as described above. However, if this threshold has not yet been reached, control flows back to block 515, for example, so that the depicted operations can be repeated as required or desired.

In addition to the forgoing operations, it is possible that some or all of the operations of blocks 505 through 530 will occur during a power interruption to the irrigation device. An example is one in which power provided by an external source (e.g., irrigation controller 122) to the irrigation device and associated components is interrupted. In view of this power loss, the method may further include the optional feature of providing power to controller 322, for example, using second energy reserve 415. This feature permits operation of the controller to be sustained for a period of time to close the solenoid, for example, using the second energy reserve.

Block 530 relates to closing the solenoid using power from a second source; namely, second energy reserve 415. If desired, an additional source may be used such that the closed operation uses power from second energy reserve 415 and first energy reserve 410.

Although the foregoing embodiments may be implemented using the exemplary series of operations described herein, additional or fewer operations may be performed. Moreover, it is to be understood that the order of operations shown and described is merely exemplary and that no single order of operation is required. Various embodiments of the present invention have been described, but still further features may alternatively or additionally be implemented in accordance with alternative embodiments of the present invention. While the invention herein disclosed has been described by means of specific embodiments, examples and applications thereof, numerous modifications and variations could be made thereto by those skilled in the art without departing from the scope of the invention set forth in the claims.

What is claimed is:

1. A method for controlling irrigation, the method comprising:
   powering an actuator to open a valve responsive to an instruction to provide irrigation using power from a first stored energy source; and
   powering the actuator to close the valve using power from a second stored energy source if a stored energy level of the second stored energy source falls below a first threshold level;
   wherein the second stored energy source is not a backup energy source for the first stored energy source;
   wherein the powering the actuator to close the valve using the power from the second stored energy source occurs independently of a stored energy level of the first stored energy source; and
   wherein the first stored energy source is configured to assist the second stored energy source in the powering the actuator to close the valve step.

2. The method according to claim 1, further comprising:
   determining the stored energy level of the second stored energy source.

3. The method according to claim 1, the method further comprising:
   providing power to a controller using the second stored energy source in the event of an interruption of power supplied to the controller by an external source.

4. The method according to claim 1, further comprising:
   determining a stored energy level of the first stored energy source, wherein the powering of the actuator to open the valve occurs only if the stored energy level of the first stored energy source exceeds a second threshold level.

5. The method according to claim 1, wherein the first stored energy source and the second stored energy source are implemented using separate devices.

6. The method according to claim 1, wherein the first stored energy source and the second stored energy source are implemented using separate capacitors.

7. The method according to claim 1, further comprising:
   initiating the powering of the actuator to close the valve if a time period during which the valve is open exceeds a maximum time threshold.

8. The method according to claim 1, further comprising:
   initiating the powering of the actuator to close the valve responsive to receiving an instruction to terminate irrigation.

9. The method according to claim 1, wherein the powering of the actuator to close the valve is accomplished using power from the second stored energy source and the first stored energy source.

10. The method according to claim 1, wherein the actuator comprises a latching solenoid.

11. The method according to claim 1, further comprising:
    receiving the instruction from an irrigation controller.

12. The method according to claim 1, further comprising:
    decoding an alternating power signal received from a multi-wire path to retrieve the instruction.

13. A method for controlling irrigation, the method comprising:
    powering an actuator to open a valve responsive to an instruction to provide irrigation using power from a first stored energy source; and
    powering the actuator to close the valve responsive to a termination condition using power from a second stored energy source which is separate from the first stored energy source;
    wherein the second stored energy source is not a backup energy source for the first stored energy source;
    wherein the termination condition is independent of a stored energy level of the first stored energy source; and
    wherein the first stored energy source is configured to assist the second stored energy source in the powering the actuator to close the valve responsive to the termination condition.

14. The method according to claim 13, wherein the termination condition occurs when a time period during which the valve is open exceeds a maximum time threshold.

15. The method according to claim 13, wherein the termination condition occurs when communication is lost between an irrigation device, which comprises the first stored energy source and the second stored energy source, and a remote irrigation controller.

16. The method according to claim 13, wherein the termination condition occurs after an occurrence of an interruption of power to an irrigation device comprising the first stored energy source and the second stored energy source.

17. The method according to claim 13, wherein the termination condition occurs responsive to receiving an instruction to terminate irrigation.

18. An irrigation device, comprising:
    an actuator configured to control water flow to at least one water delivery device;
    a first stored energy source configured to power the actuator to effect irrigation via the at least one water delivery device;
    a second stored energy source which is separate from the first stored energy source, wherein the second stored energy source is configured to power the actuator to terminate the irrigation via the at least one water delivery device; and
    a controller configured to:
    cause the first stored energy source to power the actuator to effect the irrigation responsive to an instruction to provide irrigation; and
    cause the second stored energy source to power the actuator to terminate the irrigation responsive to a termination condition;
    wherein the second stored energy source is not a backup energy source for the first stored energy source;

wherein the termination condition is independent of a stored energy level of the first stored energy source; and wherein the controller is configured to cause the first stored energy source to assist the second stored energy source to power the actuator to terminate the irrigation responsive to the termination condition.

19. The irrigation device according to claim 18, wherein the actuator comprises a solenoid.

20. The irrigation device according to claim 18, wherein the actuator comprises a latching solenoid.

21. The irrigation device according to claim 18, wherein the first stored energy source and the second stored energy source individually comprise a capacitor.

22. The irrigation device according to claim 18, further comprising:

a valve coupled to the actuator, the actuator configured to control a position of the valve to control the water flow to the at one water delivery device.

23. A method for controlling irrigation, the method comprising:

decoding an alternating power signal received from a multi-wire path to retrieve an instruction from an irrigation controller;

powering an actuator to open a valve responsive to the instruction to provide irrigation using power from a first stored energy source; and powering the actuator to close the valve using power from a second stored energy source and the first stored energy source if a stored energy level of the second stored energy source falls below a first threshold level;

wherein the second stored energy source is not a backup energy source for the first stored energy source and is responsive to receiving another instruction to terminate irrigation;

wherein the powering the actuator to close the valve using the power from the second stored energy source occurs independently of a stored energy level of the first stored energy source;

wherein the first stored energy source and the second stored energy source are implemented using separate capacitors;

wherein the actuator comprises a latching solenoid, and wherein the first stored energy source is configured to assist the second stored energy source in powering the actuator to close the valve.

24. A method for controlling irrigation, the method comprising:

decoding an alternating power signal received from a multi-wire path to retrieve an instruction from an irrigation controller;

powering an actuator to open a valve responsive to the instruction to provide irrigation using power from a first stored energy source; and powering the actuator to close the valve responsive to a termination condition using power from the first stored energy source and a second stored energy source which is separate from the first stored energy source;

wherein the termination condition is independent of a stored energy level of the first stored energy source;

wherein the second stored energy source is not a backup energy source for the first stored energy source;

wherein the first stored energy source and the second stored energy source are implemented using separate capacitors;

wherein the actuator comprises a latching solenoid; and wherein the first stored energy source is configured to assist the second stored energy source in powering the actuator to close the valve responsive to the termination condition.

* * * * *

UNITED STATES PATENT AND TRADEMARK OFFICE
CERTIFICATE OF CORRECTION

| | | |
|---|---|---|
| PATENT NO. | : 8,295,985 B2 | Page 1 of 1 |
| APPLICATION NO. | : 12/341764 | |
| DATED | : October 23, 2012 | |
| INVENTOR(S) | : Timothy J. Crist | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this
Fourth Day of November, 2014

Michelle K. Lee
*Deputy Director of the United States Patent and Trademark Office*